United States Patent
Pairault (10) Patent No.: US 8,432,707 B2
(45) Date of Patent: Apr. 30, 2013

(54) CARD DESIGN WITH FULLY BUFFERED MEMORY MODULES AND THE USE OF A CHIP BETWEEN TWO CONSECUTIVE MODULES

(75) Inventor: Jean-Jacques Pairault, Boulogne-Billancourt (FR)

(73) Assignee: Bull S.A.S., Les Clayes Sous Bois (FR)

( * ) Notice: Subject to any disclaimer, the term of this patent is extended or adjusted under 35 U.S.C. 154(b) by 131 days.

(21) Appl. No.: 13/166,747

(22) Filed: Jun. 22, 2011

(65) Prior Publication Data

US 2011/0318964 A1    Dec. 29, 2011

Related U.S. Application Data

(62) Division of application No. 11/622,182, filed on Jan. 11, 2007, now Pat. No. 8,018,736.

(30) Foreign Application Priority Data

Jan. 11, 2006 (FR) ...................................... 06 00249

(51) Int. Cl.
*H05K 1/11* (2006.01)

(52) U.S. Cl.
USPC ........... 361/803; 361/728; 361/799; 361/783; 361/784; 361/785

(58) Field of Classification Search .................. 361/803, 361/799, 728, 783–785
See application file for complete search history.

(56) References Cited

U.S. PATENT DOCUMENTS

| | | | |
|---|---|---|---|
| 2,379,768 A | 7/1945 | Van Wynen | |
| 6,658,509 B1 | 12/2003 | Bonella et al. | |
| 7,444,540 B2 * | 10/2008 | Shaw | 714/6.1 |
| 7,477,526 B1 * | 1/2009 | Co | 361/803 |
| 7,487,428 B2 | 2/2009 | Co et al. | |
| 7,577,039 B2 * | 8/2009 | Yang et al. | 365/189.05 |
| 2004/0123016 A1 | 6/2004 | Doblar et al. | |
| 2005/0138348 A1 | 6/2005 | Bolay et al. | |
| 2007/0162670 A1 | 7/2007 | Yang et al. | |

FOREIGN PATENT DOCUMENTS

WO    WO 2005 117019 A1    12/2005

OTHER PUBLICATIONS

Howard David, Michael McTague, Intel Corp., dated Feb. 18, 2004, "Fully Buffered DIMM (FB-DIMM) Design Considerations", pp. 1-35.

Pete Vogt, Intel Corp., dated Feb. 18, 2004, "Fully Buffered DIMM (FB-DIMM) Server Memory Architecture: Capacity, Performance, Reliability, and Longevity", dated Feb. 18, 2004, pp. 1-33.

Juergen Carstens, "Speichercontroller mit programmierbarer Impedanz der Ausgangstreiber", dated Apr. 16, 2005, IP. Com Journal, P. Com Inc., West Henrietta NY.

* cited by examiner

*Primary Examiner* — Yuriy Semenenko
*Assistant Examiner* — Andargie M Aychillhum
(74) *Attorney, Agent, or Firm* — Miles & Stockbridge P.C.

(57) ABSTRACT

An AMB component and a connection interface for a memory installation with fully buffered Dimm memory modules connected in series. The AMB component is disposed on a connecting line from memory modules to a memory controller of the memory installation to re-amplify the connecting line between two consecutive FBD memory modules. The connection interface includes an AMB amplifier component for the connection of a main memory card that includes at least one processor, to an auxiliary memory card of the type having a series of memory modules. Two series of FBD memory modules are connected to respective FBD channels in the auxiliary memory card using FBD connectors in a daisy-chain arrangement.

7 Claims, 5 Drawing Sheets

CARD DESIGN WITH FULLY BUFFERED MEMORY MODULES AND THE USE OF A CHIP BETWEEN TWO CONSECUTIVE MODULES

CROSS-REFERENCE TO RELATED APPLICATION

This application is a division of application Ser. No. 11/622,182 filed Jan. 11, 2007.

TECHNICAL AREA OF THE INVENTION

This present invention relates to the area of the FB-Dimm bar type memories. The invention more particularly concerns an arrangement of fully buffered Dimm memory module cards, and the use, in a memory card in the FBD (Fully Buffered Dimm) technology, of at least one AMB (Advanced Memory Buffer) chip between two consecutive memory modules.

TECHNOLOGICAL BACKGROUND OF THE INVENTION

One is familiar from previous designs with the use of memory modules of the DIMM (Dual In-line Memory Module) type in computer equipment, where these memory modules generally take the form of 64-bit memory bars, equipped with 84 connectors on each side, making 168 in all. A "daisy chain" topology is often employed to establish the connection between the memory modules. More particularly, such a topology is used between modules of the FBD type (Fully Buffered Dimm; JEDEC JC-45.4). The expression "daisy chain" used to indicate a method of connection between modules, or between machines, that uses a single logic line to connect the modules to each other.

An essential point of the FB-DIMM channel architecture is thus a high-speed serial point-to-point connection between the memory controller and the modules in the channel. In a manner that is already known, the FBD modules are connected in a "daisy chain" on an FB-DIMM channel. These FBD modules are equipped with advanced memory buffer circuits (AMB) in accordance with the JEDEC AMB (Advanced Memory Buffer) specifications.

The AMB chip placed on each FBD module collects and distributes the data exiting or entering a module, buffers the data in the chip and receives them from or sends them to the FBD module or the next memory controller. This channel structure overcomes the problems of buffer latency, which are common in the register-type DIMM technology, and enables the designers to use a large number of FBD modules in a given system. It is possible to place up to 8 DIMM modules in one channel.

In prior art, the FBD modules or bars are connected in a daisy chain fashion, in which they are spaced regularly from each other (see documents US 2004/0123016 and U.S. Pat. No. 6,658,509, for example). In this chain, the electrical distance constraints between 2 consecutive bars are very severe, given the electrical characteristics of the link (high speeds with several billiards transfers per second (GT/s), for example, the desire to achieve very narrow tracks on the cards, compatibility with standard and inexpensive card materials, FR4 flame resistance, and so on), and those of the AMB circuit, for which it is necessary to minimise heat dissipation and also production costs.

Thus at throughputs of 6.4 GT/s, the generally accepted recommendation for the separation between 2 modules or consecutive bars on the same card is that it should be between 8.9 and 22.8 mm. In addition, a separation of 22.8 mm is possible only if the two bar connectors are on the same support, with the permitted distances being further reduced otherwise. By way of an example, it is not permitted to create a connection linking FBD modules located on different superimposed stages because of the excessively large spacing between the stages (the distance between the bars then no longer observes the aforementioned constraints).

There is therefore a need to broaden the scope of the topologies that are available to the FB-Dimm memory modules.

GENERAL DESCRIPTION OF THE INVENTION

This present invention has as its aim to overcome one or more of the drawbacks of prior art, by proposing an arrangement of fully buffered Dimm memory module cards that allows the geometrical constraints in the use of memory bars of this FB-Dimm technology to be eased.

To this end, the invention concerns an arrangement of a memory card with at least one series of memory modules connected in a connecting line to a memory controller, characterised in that the connecting line comprises at least two consecutive FBD memory modules each equipped with a component of the AMB type, and connected together by at least one intermediate AMB component for re-amplification of the connecting line.

According to another particular feature, the intermediate AMB component comprises electrical contact resources to be connected to connection resources of the memory card placed between the two consecutive FBD memory modules.

According to another particular feature, the intermediate AMB component comprises a rapid transit device for the incoming data, which is linked directly to an FB-Dimm channel serial interface.

According to another particular feature, the intermediate AMB component is connected to a connector of the memory card in the place of a memory module.

According to another particular feature, the intermediate AMB component is placed on a connection interface of the memory card, with an auxiliary memory module card allowing the connecting line to be extended.

According to another particular feature, the memory controller of the memory card is connected to at least one pair of channels, with each channel of a pair being connected to an external link connector of the memory card, where the external link connector comprises two distinct series of electrical contact strips connected respectively to the two channels of a pair provided on the card.

According to another particular feature, each of the channels of a pair is fitted with an intermediate AMB component.

According to another particular feature, the external link connector is arranged to be associated with a connection interface providing the link to an auxiliary memory card.

According to another particular feature, the arrangement of the invention comprises a connection interface inserted into the said external link connector, where the connection interface comprises the following:

two plugs of the FBD type, compatible with the said external link connector, each equipped with two series of electrical contact strips, where a first of these plugs constitutes a linking resource designed to be connected to two output channels of the memory card, and a second of these plugs constitutes a linking resource designed to be connected to two input channels of an auxiliary memory card of the type with a series of FBD memory modules; and internal connection resources to connect the first plug to the second plug of the said interface, and comprising at least one intermediate AMB component for re-amplification of the inter-card connection.

Another aim of the invention is to propose a connection interface that allows the connection of a maincard to a memory card, which is designed to cope with the constraints of storage systems with channels made up in pairs, where the connection method aims to facilitate the creation of an evolution-capable memory configuration, by progressive and simultaneous incrementing of the two channels.

To this end, the invention concerns a connection interface for the connection of a maincard that comprises at least one processor to an auxiliary memory card of the type with a series of memory modules, characterised in that it includes:

two connecting plugs of the FBD type, each equipped with two series of electrical contact strips, where each of the plugs can be inserted into a two-way connector of the FBD type, with a first of these plugs constituting a linking resource designed to be connected to two output channels of the maincard, and a second of these plugs constituting a linking resource designed to be connected to two input channels of an auxiliary memory card of the type with a series of FBD memory modules divided between at least two channels; and internal connection resources to connect the first plug (201) to the second plug in the said interface, and comprising at least one intermediate AMB component for re-amplification of the inter-card connection.

Thus, the invention advantageously allows the extension of the connecting line by the use of one or more AMB re-amplification components. The connection interface performs matching or pairing of the FB-Dimm connectors, with a first connector being used as a double input connected to a maincard, and a second connector being used as a double output connected to an auxiliary memory card. This type of connection interface allows the easy addition of one or more optional daughter cards to a mothercard.

An additional objective of the invention is to propose a connection interface that results in a more compact design while also providing easy access to the memory modules.

To this end, the connection interface includes at least one intermediate adapter body attached to the first plug and to the second plug and extending over a sufficiently large area to provide support for the auxiliary memory card and to keep the latter spaced in relation to the maincard, while also being designed for the lengths of the internal links connecting the first plug to the second plug.

According to another particular feature, the intermediate adapter body is an extension card for a maincard, and the internal links form two channels, each equipped with a AMB amplifier component.

According to another particular feature, the two plugs are identical and are placed on either side of a median plane of the connection interface.

According to another particular feature, the two plugs are coplanar and oriented in opposite directions to allow the connection of auxiliary memory cards placed parallel to the median plane.

According to another particular feature, each intermediate AMB component includes a rapid transit device for the incoming data, which is linked directly to an FB-Dimm channel serial interface.

Another aim of the invention is to propose an original use of an AMB component, in order to offer a greater variety of fully buffered Dimm memory module cards.

To this end, the invention concerns the use of an AMB component in a memory installation with fully buffered Dimm memory modules connected in series, characterised in that the AMB component is placed on a connecting line from the memory modules to a memory controller of the installation, in order to re-amplify the connecting line between two consecutive FBD memory modules.

Thus the AMB component, of reduced dimensions, allows the geometrical constraints concerning the use of memory bars of the FB-Dimm technology to be eased.

The characteristics and advantages of the invention will emerge more clearly on reading the description that follows, with reference to the appended drawings in which.

DESCRIPTION OF THE PREFERRED METHODS OF IMPLEMENTATION OF THE INVENTION

The invention proposes to use an AMB component (Advanced Memory Buffer) 25 in an unusual way in a memory installation with fully buffered Dimm memory modules connected in series, in order to extend the connection and in particular to allow the implementation of connections between storage groups that are not aligned. According to conventional use, the essential function of the AMB is firstly to act as data buffer for the exchanges between the memory chips in the bar and the memory controller managing the FB-Dimm channel, and secondly to perform matching between the interfaces of the standard, bought-in memory chips (DDR2 or DDR3 type) and the serial interface of the FB-Dimm channel.

The invention aims to use the AMB component (25) as a re-amplifier for the FB-Dimm channel by virtue of its usual role in series "daisy chain" arrangements, and the presence of a rapid throughput device (26, 27) which is used to re-amplify the data.

The invention thus aims to better position the memory modules (bars) from the ergonomic standpoint. In general, within a 2 or 3U shelf unit (1U=44.45 mm according to the EIA-310-D standard allowing the identification and the vertical positioning of computer equipment in a rack of the high-density type in data centres, network rooms and cable cabinets), it is possible to use height in order to divide the memory modules, allowing the surface area of the support card to be freed.

Figure 1:
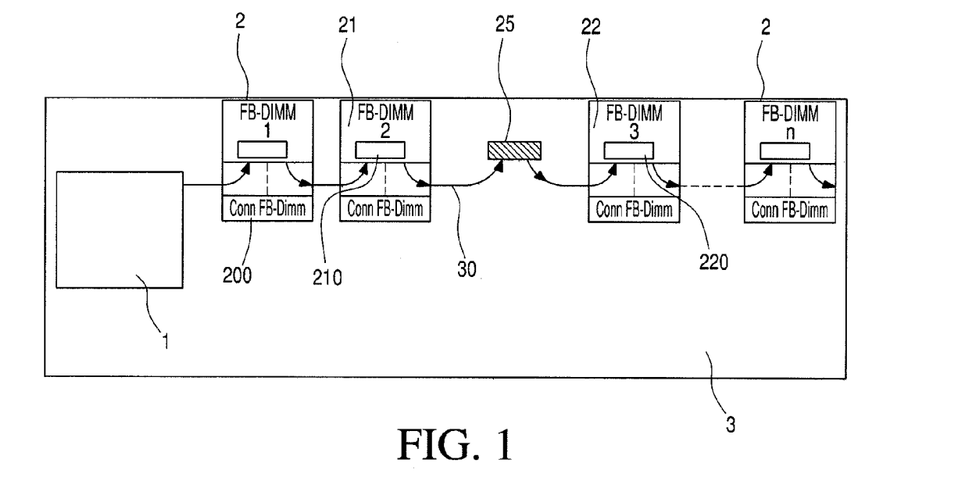
FIG. 1 is a schematic view of the memory arrangement according to one method of implementation of the invention, with a connection between memory modules that is extended by virtue of the AMP amplifier component.

According to the invention, the AMB component (25) is a chip that is specifically placed on a connecting line (30) from the memory modules (2) to a memory controller (1) in the installation, which is used to extend the distance between consecutive FBD memory modules (21, 22). The electrical distance constraints are then no longer problematic since the AMB component (25) is used to re-amplify the connecting line (30) between two consecutive FBD memory modules (21, 22), as illustrated in FIG. 1.

In contrast to the standard components designed to re-amplify a signal, the AMB component (25) is a very small chip, which is particularly well suited to the specific characteristics of the FB-Dimm channel. The manufacture of a special re-amplfier could certainly be envisaged with a view to extending an FB-Dimm channel, but it would then be necessary to design a re-amplifier of a new type, and this would be a costly exercise.

In a manner that is already known as such, organisation in series within a Dimm memory card requires the presence of an AMB (Advanced Memory Buffer) circuit on each memory bar. This AMB component coordinates and organises the data in memory transferred in packets, storing even the memory data in the buffer, and no longer just the memory addresses, which explains the "fully-buffered" title. Obviously, ECC error correction (Error Correction Code) is still present and still using the AMB circuits, which are employed to correct the errors in a synchronised manner between the different bars of RAM (Random Access Memory).

Figure 2:
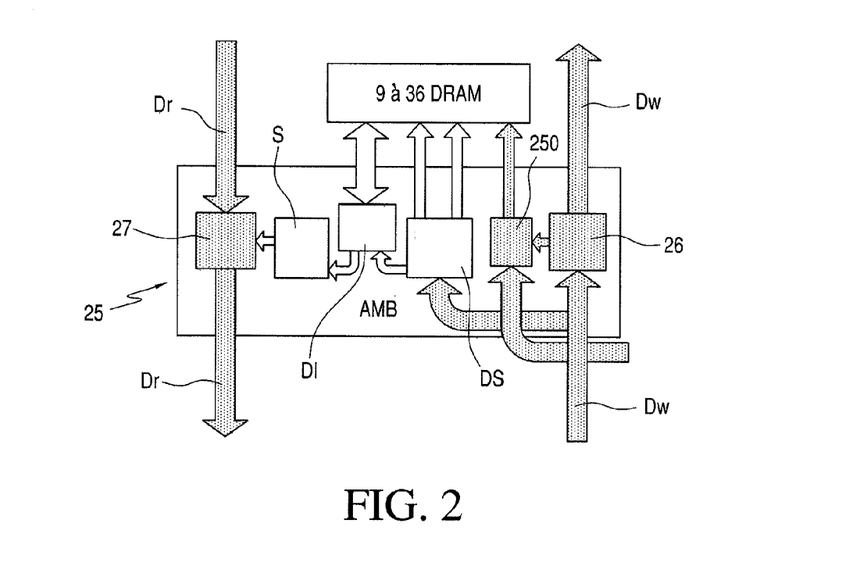
FIG. 2 shows a block diagram of the AMB component.

Referring to FIG. 2, the functions of the AMB component (25) according to the invention allow a re-amplification of the signal. The AMB component (25) incorporated into the connecting line (30) of the invention is a component that is isolated from the storage zones. The AMB (25) employed in this way is therefore no longer performing its usual functions:
   to act as a data buffer for the exchanges between the memory circuits of the bar and the memory controller 1 managing the connection 30 forming an FB-Dimm channel; and
   to perform matching between the interfaces of the standard, bought-in memory circuits and the serial interface of the FB-Dimm channel.

Instead, it is used as a re-amplifier of the FB-Dimm channel, a function that it performs very well indeed because of its usual role in the "daisy chain", and because of the rapid throughput device (26, 27) with which it is equipped. As illustrated in FIG. 2, the intermediate AMB component (25) has a rapid throughput device (26, 27) for the incoming data (Dr, Dw), which is linked directly to an FB-Dimm channel serial interface. These data (Dr, Dw) merely pass through the chip represented in FIG. 2. The clock (250) is used to regulate the throughput of the data (Dr, Dw). This clock (250) is designed using the DDR (Double Data Rate Memory) technology, which enables each clock cycle to transmit two packets of data.

The addressing mechanisms, which select the AMB component to be used from among all of the components of this type placed in a given channel, will never select the AMB component used as an amplifier, since none of the memory addresses that will be requested during an access to this channel will be identified as being dependent upon this special additional AMB component. It is for this reason that the aforementioned usual functions are no longer performed for the intermediate AMB component specified by the invention. The creation of correspondence between the address and AMB sub-spaces forms part of the channel initialisation routine that is run prior to its use.

In a card (3) using the FB-DIMM technology, a protocol is established between the memory-controller (1) and the memory modules (2). The card (3) shown in FIGS. 1, 3, 5A and 6A is a mothercard and the memory-controller (1) a central processing unit (CPU or processor). With the FB-DIMM technology, the type of chips employed in the module 2, of the DDR2 or DDR3 type for example, is of no importance to the memory-controller (1) since the latter does not communicate directly with the chips but rather with the module (2) only. The fact that the AMB chips (25) are located between memory modules (2) therefore causes no complication and ensures re-amplification in the AMB component (25). The distance covered between two successive bars or modules (2) can therefore be multiplied by 2. The chip forming the AMB (25) is smaller in size than a memory bar and can be installed where the next bar cannot, namely between 2 bars for example, without giving rise to any significant construction constraint.

The AMB component (25) is equipped with data exchange elements (S, DS, DI) designed to exchange data with a memory installation (of 9 to 36 DRAM memory modules). These elements (S, DS, DI), including a serialiser (S), a de-serialiser (DS) used to decode incoming control/write data (Dw) and a data interface (DI), are inactive because of the absence of memory associated with the AMB component (25) that is used to amplify the signal. According to the invention, The AMB component (25) is used as a re-amplifier of the FB-Dimm channel connecting two consecutive memory modules (21, 22), as illustrated in FIGS. 1, 3 and 4.

The arrangement of the memory card (3) is then modified in relation to the known arrangements, since the connecting line (30) includes an AMB component (25) for re-amplification of the line (30) in an intermediate position between consecutive FBD memory modules (21, 22), each equipped with an internal component of the AMB type (210, 220). In the method of implementation of FIGS. 1 and 4, the intermediate AMB component (25) can occupy the space intended for a memory module 2. This intermediate AMB component (25) comprises electrical contact resources to be connected to connection resources on the memory card (3) placed between the two consecutive FBD memory modules (21, 22). A connector (not shown) on the memory card (3) can thus be used to receive the intermediate AMB component (25) in place of a memory module (2). The connector can consist of a simple slot for the accommodation of a pin or similar electrical connecting resource.

Referring to FIGS. 3, 5A, 5B, 6A and 6B, the intermediate AMB component (25) can be placed on a connection interface of the memory card (3) with an auxiliary card (31, 32, 33) with memory modules (2), allowing the connecting line to be extended (30). The card (3) is a mothercard equipped with a maximum of 8 memory modules (2) of the FBD type, and the auxiliary card (31, 32, 33) thus allows the memory capacity to be improved. The respective memory modules (2) can thus be connected using a multi-line bus, in the manner of a "daisy chain", on each FB-DIMM channel (40, 41).

Figure 3:
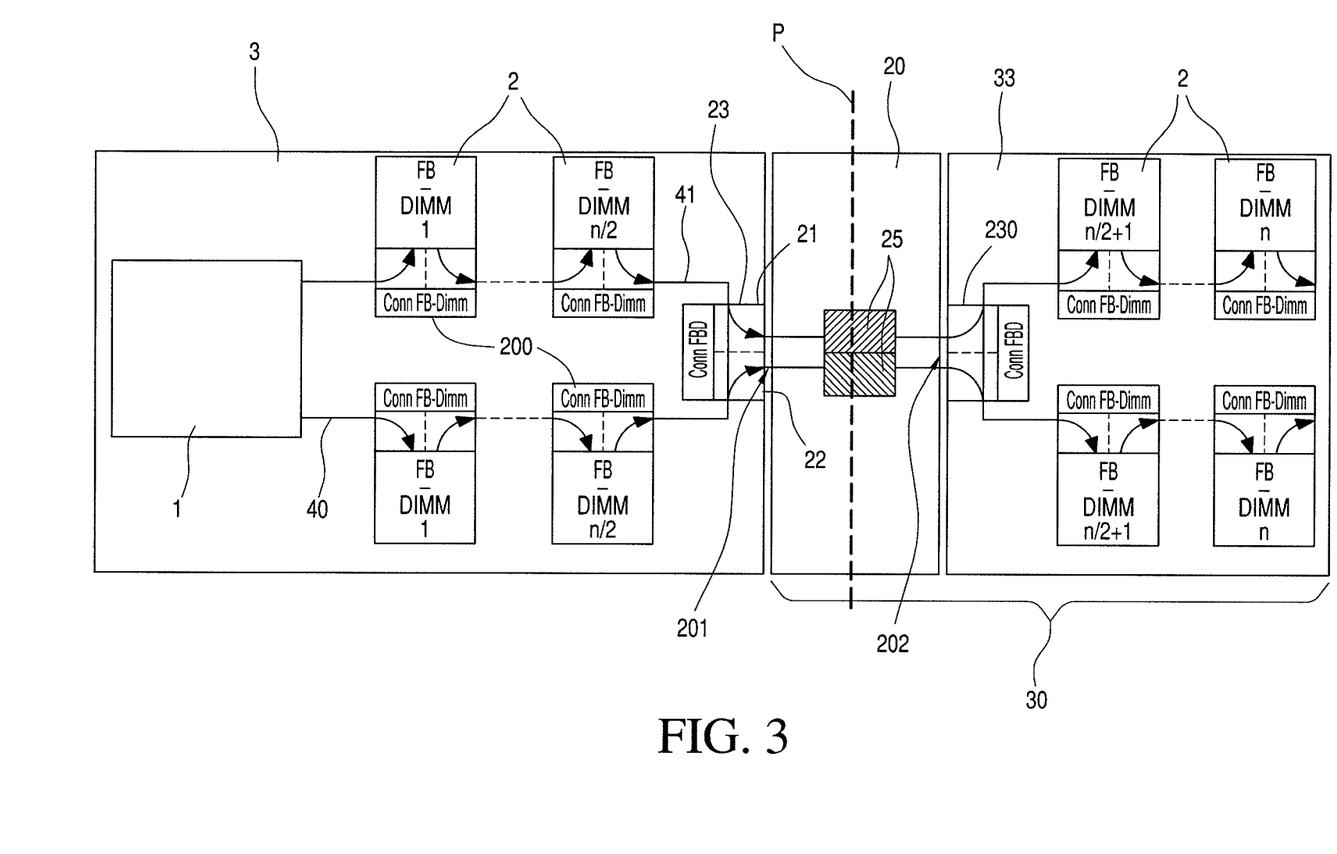
FIG. 3 is a schematic view of the connection between a mothercard and a memory card, accomplished using a connection interface of the invention.
Figure 4:
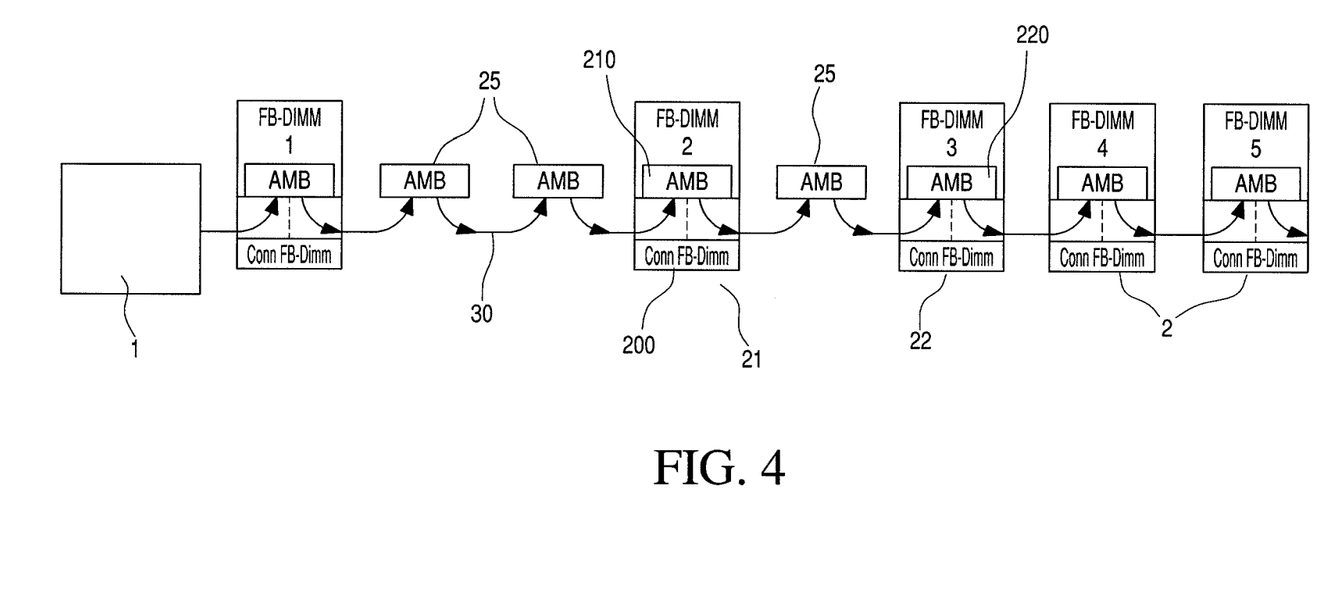
FIG. 4 shows a connection variant of the memory modules, using several AMB components, FIGS. 5A and 5B respectively show a view in perspective and a view in section of a link between a maincard and an auxiliary memory card created using a connection interface of the invention, FIGS. 6A and 6B respectively show a view in perspective and a view in section of the links permitted by the invention between a maincard and two auxiliary memory cards.

In the method of implementation of FIG. 3, a connection interface is provided which is designed to connect an auxiliary multi-line input/output memory card 33 in parallel. In a manner that is already known, it is possible to place up to eight DIMM memory modules on one channel, with each module (2) being in the form of a memory bar for example. The amplifying AMB component (25) can be used to remote the memory modules (2) from the maincard (3), in particular so as to minimise the area occupied by the card (3) which generally already includes a processor. This processor constitutes the memory-controller 1 which communicates over two channels (40, 41) or several pairs of channels for example.

Referring to the example of FIG. 3, the connection interface of the invention is particularly suitable for establishing links between a maincard (3) with memory and an auxiliary memory card (31, 32, 33). Because of the fact that the auxiliary memory card (31, 32, 33) must be of the type with a series of memory modules (2), which advantageously comprise two series of these modules (2), the interface can be equipped with two connecting plugs (201, 202) of the FBD type, each equipped with two distinct series of electrical contact strips or any other connecting devices with the right number of contacts. This interface complies with the FBD standard for example, with a first of these plugs (201) constituting a linking resource designed to connect two output channels (40, 41) of the maincard (3), with a second of these plugs (202) constituting a linking resource designed to connect two input channels of a memory card (31, 32, 33) of the type with a series of FBD memory modules divided between at least two channels. In one method of implementation, each of the plugs (201, 202) can be the plug located on an FBD memory module (2). Since the connector (23, 230, 200) is symmetrical, two FB-Dimm channels (40, 41) can act as input (or output) on its two halves. In other words, it is possible to use an "in-out" connector as an "in-in" connector or as an "out-out" connector. In an advantageous alternative method of implementation, other types of "in-in" and "out-out" connector are provided to establish the link with the adapter element (20).

It can be seen that each of the two series of electrical contact strips provided in the plugs (201, 202) of the connection interface allow adaptation to an output of a transmission channel or to an input of a transmission channel. As illustrated by way of a non-limiting example in FIGS. 3, 5B and 6B, a first plug (201) constitutes a linking resource designed to be connected to two channels of a maincard (3), and the second plug (202) constitutes a linking resource designed to be connected to two channels of an auxiliary memory card (31, 32, 33) of the type with two series of memory modules (2). The series of FB-DIMM modules are divided between the respective channels on the memory card (31, 32, 33).

As shown in FIG. 3, internal links are provided respectively on the connection interface for connection of the first plug (201) to the second plug (202). These internal links form two channels each equipped with an AMB amplifier component (25) for example. The connection interface is therefore used, together with an auxiliary memory card (33), to form an optional part 300 that can be connected to the maincard (3). In a preferred method of implementation of the invention, the connection interface comprises at least one intermediate adapter body (20) attached to the first plug (201) and to the second plug (202). This intermediate adapter body (20), composed of a rigid material for example, extends over a sufficiently large area to provide support for the auxiliary memory card (31, 32, 33) and to keep the latter spaced in relation to the maincard 3. As illustrated in particular in FIGS. 5A and 6A, the intermediate adapter body (20) can consist of an extension card, equipped, for example, with fixing resources placed on two opposite edges of the extension card and with appropriate conductors. The intermediate adapter body (20) can be rendered attached to the main memory card (3) or to an auxiliary memory card (31, 32, 33). An auxiliary memory card (31, 32, 33) can, for example, be provided with the fixed connection interface, in a irremovable manner, on the body of the card (31, 32, 33).

The two plugs (201, 202) are identical, and are placed on either side of a median plane (P) of the connection interface. For example, the plugs (201, 202) are coplanar and oriented in opposite directions in order to allow the connection of auxiliary memory cards (31, 32, 33) placed parallel to the median plane (P) (FIG. 6B).

Figure 5A:
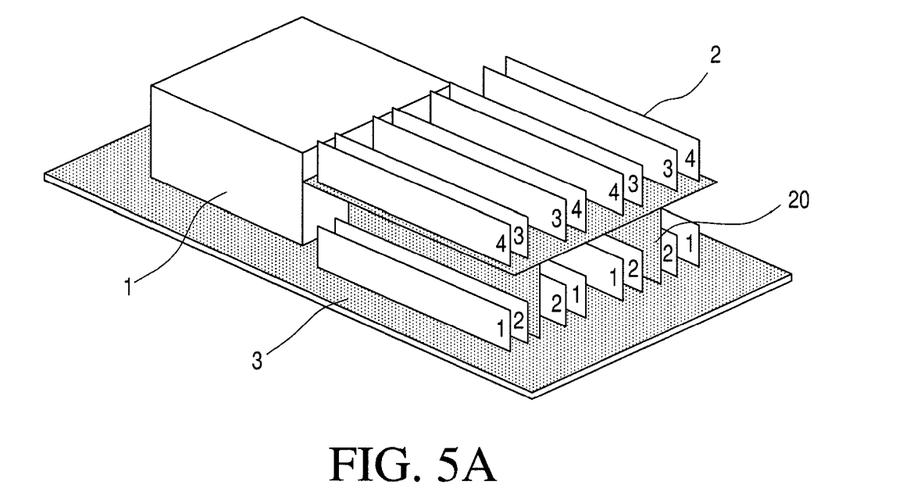
Figure 6A:
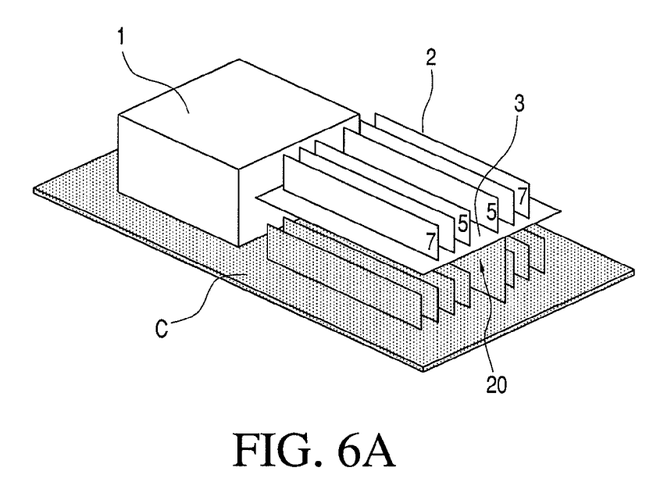
Figure 6B:
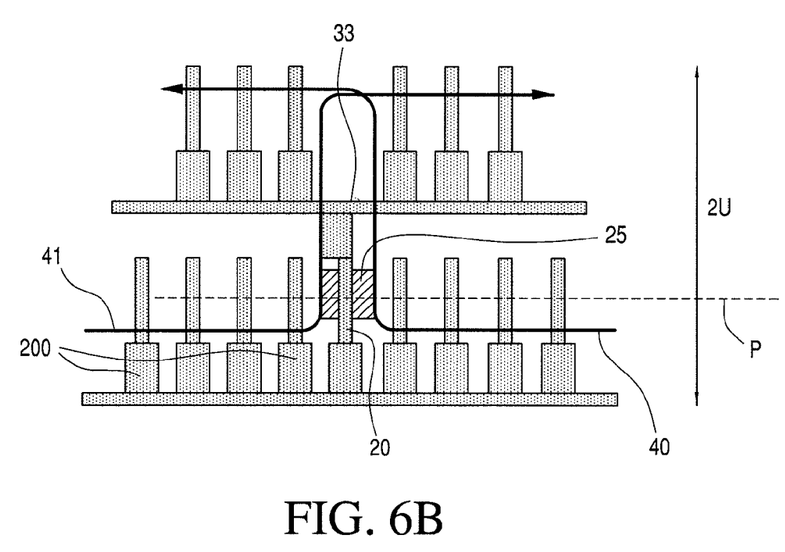

Referring to FIGS. 5A and 6A, one possible topology with the connection interface of the invention provides for the division of fourteen FBD modules over two height levels, in a superimposed manner. Advantage is therefore taken of the space that is "lost" in the known arrangements, above the electronic components built into the card (3). The so-called main memory card (3) can then be equipped with nine slots (9 bars on the CPU card represent an area of 102 mm×160 mm). Such an arrangement extends over a height of 2U (88.9 mm). The occupation of the main memory board 3 is then low, since only half of the memory modules (2) need to be installed on it for example.

Access to the memory modules (2) remains easy, this being achieved via the top of the unit. The two channels (40, 41) that operate with each other must have the same number of memory modules (2). When the memory capacity is increased, free slots are filled in the order from 1 to 7 for example. When the memory capacity is reduced, the FB-Dimm bars or similar modules are removed in the reverse order (for continuity of the "daisy chain"). In the example of FIGS. 6A and 6B, changing slots 1 to 4 located on the main memory card (3) assumes that there is no memory in slots "5". In this case the memory card (33) can be removed (assuming that it was installed) thus freeing access to the memory modules (2) on the main memory card (3) with memory-controller (1). In contrast to a fixed system, the use of the connection interface of the invention means that the auxiliary card (31, 32, 33) equipped with its memory modules (2) becomes a removable component.

It is clear that the number of connectors (200) of memory modules (2) can be increased in a flexible manner by virtue of the connection interface of the invention. Thus, six additional connectors (200) are provided so as to install in all seven connectors per channel (40, 41) in the example of FIGS. 6A and 6B. On the same principle, when the maincard (3) has four channels (40, 41, 42, 43), eight additional connectors (25) are provided in the example of FIGS. 5A and 5B, so as to install in all four connectors per channel (40, 41, 42, 43). In this last case, two auxiliary memory cards (31, 32) are superimposed on the maincard (3).

Figure 5B:
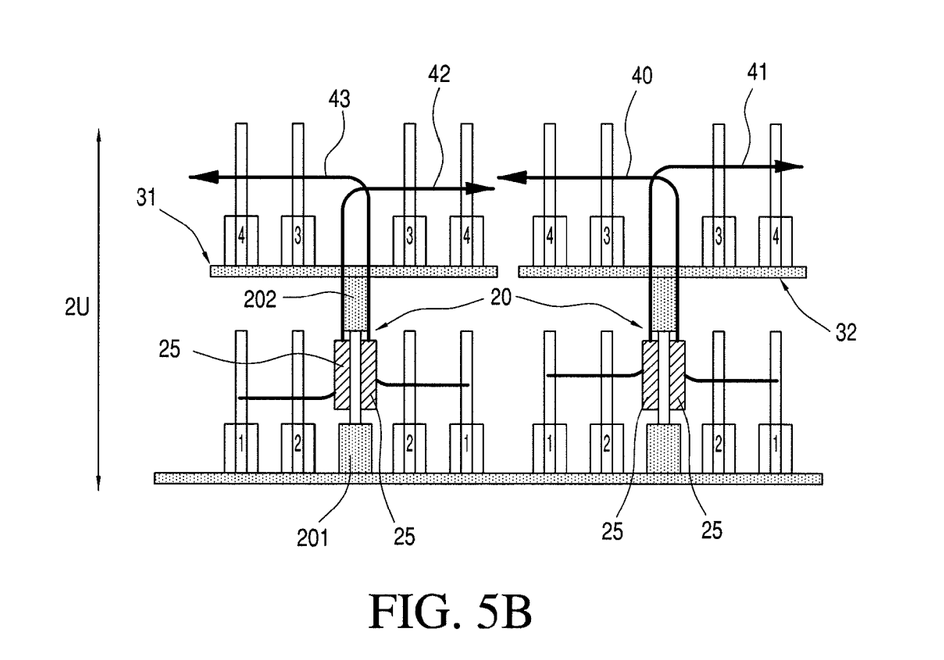

All the configurations in which extension cards with connecting plugs (201, 202) of the FDB type are placed between two connectors (23, 230) of the successive FB-Dimm type can be constituted (and not only half of the "daisy chain"). The connection interface of the invention must simply be equipped with the internal connection resources that have at least one intermediate AMB component (25) for re-amplification of the inter-card connection (30). The (optional) extension cards advantageously include an AMB amplifier component (25) per channel, as illustrated in FIGS. 3, 5B and 6B.

As illustrated in FIG. 3, the main memory card (3), equipped with at least one pair of FBD channels connected to the processor (1), advantageously includes one or more external link connectors (23) with a sufficient number of contacts to provide a link between the maincard (3) and a daughter card. This connector (23) has two halves, each connected to a channel FBD distinct.

In the example of FIG. 3 and those following, the main memory card (3) includes connectors of the FBD type (200) provided in order to connect memory modules of the FBD type (2). These FBD connectors (200) are connected in series between the processor (1) of the maincard 3 and the external link connector (23), with the connection being effected for each series by simple links of one of the channels (40, 41). In other words, each FBD connector (200) is interconnected between two portions of a given channel (40, 41). Each channel serving a first series of FBD connectors (200) opens into another distinct paired channel which serves a second series of FBD connectors (25) in the respective halves of an external link connector (23). Each half of the external link connector (23) comprises a series of electrical contact strips connected to a channel of the main memory card (3). One series of electrical contact strips is intended to make contact with a corresponding series of electrical contact strips placed on the FDB-type connecting plug (20)1 of the interface used to connect the maincard (3) to a daughter card.

It can be seen that the external link connector (23) is special since it is connected to two distinct channels (40, 41) on the mothercard, in contrast to the other connectors 200 used to connect the memory modules (2). It can also be a special connector that is different from the FBD connectors (200). Thus, this external link connector (23) is used to associate the maincard (3) with a connection interface providing the link with an auxiliary memory card (31, 32, 33). The connection interface is inserted into the said external link connector (23) by a first edge, with an opposite edge being inserted into a special connector (230) provided on the daughter card to connect to the main memory card (3). The special connector (230) of the auxiliary memory card (31, 32, 33) is connected to two channels which are respectively equipped with a memory module or a series of memory modules (2).

As illustrated in FIG. 3 and those following, the auxiliary memory card (31, 32, 33) which can equip the main memory board (3) has channels of the memory card that are each connected to a linking module with another card, in this case with the maincard (3). This linking module in all receives two distinct channels of the FBD type and includes the connector (230) of the FBD type or another suitable connector which is specifically connected to the two channels. The special connector (230) includes two distinct series of electrical contact strips connected respectively to the two paired channels of the auxiliary memory card (31, 32, 33). As shown in FIGS. 5B and 6B, the auxiliary memory card (31, 32, 33) includes two opposing faces, one of which supports connectors (200) of the FBD type to connect FBD memory modules (2) while the other face supports the connector (230) of the linking module. This special connector (230) is therefore oriented in an opposite manner in relation to the other connectors (200) and can therefore be used to receive a connection interface of the extension card type for a main memory board 3. The module for joining together of the memory card (31, 32, 33) has conducting elements that are used to connect the channels of the card (3, 31, 32) to the special connector (230). It can be seen that in the auxiliary memory card (31, 32, 33), each channel of the FBD type is connected to the connectors (200) of the FBD type by a daisy-chain arrangement, each of the channels having one end connected to the said linking module.

One of the advantages of the invention is the ability to introduce greater flexibility into the topologies that are possible for the FB-Dimm bar type memories, in a simple and economic fashion. In addition, the cards (3) with FB-Dimm memory modules (2) created through the invention do not adversely affect performances, and the only "cost" of re-amplification is a time of the order of 2 ns, and only in the specifications of the AMB chips. It is also clear that the AMB components (25) are chips of a nominal cost only, because of their use in the memory bars (they are going to be sold in very large quantities and are therefore going to benefit from the effects of scale).

Another of the advantages of the invention is to facilitate, in the FB-Dimm technology, the connection of daughter cards equipped with memory modules (2) so as to optimise the surface of the maincard (CPU card, for example).

It should be obvious to all those who are well versed in this area that this present invention allows methods of implementation in many other specific forms without moving outside the area of application of the invention as claimed, and the invention should not be limited to the details provided above.

The invention claimed is:

1. A connection interface for the connection of a main memory card having at least one processor with an auxiliary memory card having a series of memory modules, the connection interface comprising:
    two connecting plugs of a Fully Buffered Dimm (FBD) type each equipped with two series of electrical contact strips, wherein each of the connecting plugs is adapted to be insertable into a two-way connector of the FBD type, wherein a first of said connecting plugs is a linking resource constructed to be connected to two output channels of the main memory card, and a second of said connecting plugs is a linking resource constructed to be connected to two input channels of an auxiliary memory card of a type with a series of FBD memory modules divided between at least two channels; and
    internal connection resources adapted to connect the first plug to the second plug in the said connection interface, said internal connection resources comprising at least one intermediate Advanced Memory Buffer (AMB) component configured to provide re-amplification of an inter-card connection.

2. The connection interface according to claim 1, further comprising:
    at least one intermediate adapter body attached to the first plug and the second plug and extending over an area to provide support for the auxiliary memory card and to maintain the main memory card in a spaced relationship with respect to the main memory card, while also being constructed to accommodate lengths of internal links connecting the first plug to the second plug.

3. The connection interface according to claim 2, wherein the intermediate adapter body is an extension card for a main memory card and the internal links form two channels each equipped with an AMB amplifier component.

4. The connection interface according to claim 1, wherein the first and second plugs are identical and are respectively disposed on either side of a median plane of the connection interface.

5. The connection interface according to claim 1, wherein the first and second plugs are coplanar and oriented in opposite respective directions to allow connection of auxiliary memory cards disposed parallel to the median plane.

6. The connection interface according to claim 1, wherein said at least one intermediate AMB component includes a rapid transit device for receiving incoming data, said rapid transit device being linked directly to an FB-Dimm channel serial interface.

7. A method comprising:
    re-amplifying a signal transferred via a connecting line between two consecutive FBD memory modules using an AMB component placed on the connecting line between a plurality of memory modules to a memory controller of a memory including fully buffered Dimm memory modules.

* * * * *